E. R. RITTER.
ATTACHABLE VEHICLE SPRING.
APPLICATION FILED DEC. 26, 1919.
1,387,615.
Patented Aug. 16, 1921.
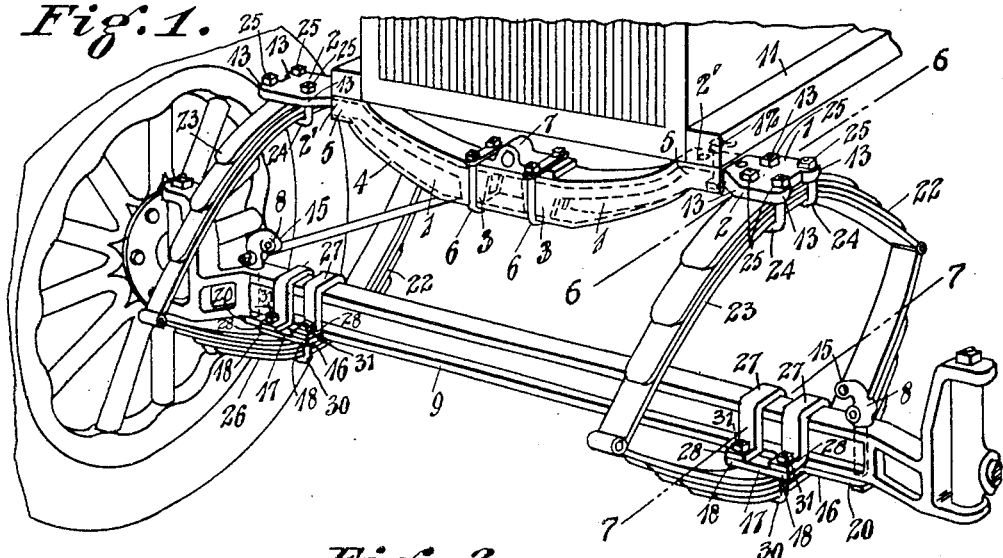
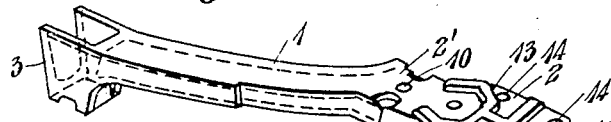
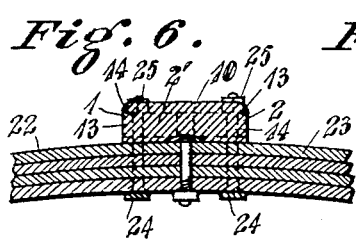
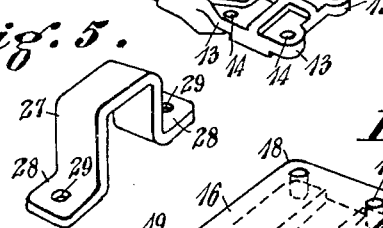
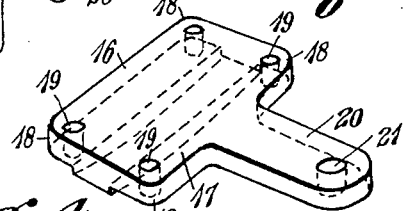
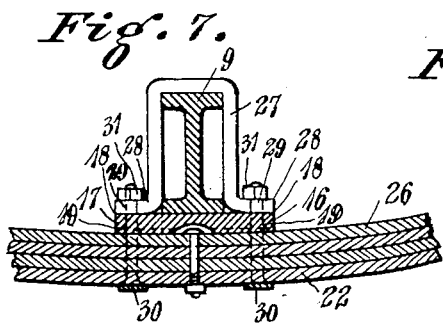
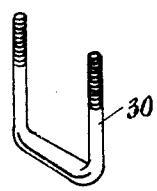
Inventor
Elmer R. Ritter
By Clarence Perdew
Attorney.

UNITED STATES PATENT OFFICE.

ELMER R. RITTER, OF CINCINNATI, OHIO.

ATTACHABLE VEHICLE-SPRING.

1,387,615.    Specification of Letters Patent.    Patented Aug. 16, 1921.

Application filed December 26, 1919. Serial No. 347,534.

*To all whom it may concern:*

Be it known that I, ELMER R. RITTER, a citizen of the United States, residing at Cincinnati, in the county of Hamilton and State of Ohio, have invented a certain new and useful Attachable Vehicle-Spring, of which the following is a specification.

My invention relates to road-vehicle springs, and more especially to motor-vehicle springs; that herein shown being especially applicable to motor vehicles of a certain kind which are in use in very large numbers throughout the country.

The object of my invention is to provide that kind of vehicle, or any other kind of vehicle wherein the same conditions are encountered, with more effective cushioning means than is constituted by the spring with which such vehicles are regularly equipped.

A further object is to provide this improved equipment at the front of the vehicle in such a way that effectively acting means of this kind will not interefere with the turning of the front wheels or disrupt or hinder the operation of any of the other regularly supplied devices on the front of the vehicle.

Another object is to make it very easy to apply such a spring equipment to such of these vehicles as are in use, so that the driver, owner, or other person concerned, even without much mechanical skill or the use of any but the simplest tools, may quickly and inexpensively provide for these added advantages in a vehicle of the kind alluded to, or in other vehicles wherein similar conditions prevail and the construction permits of the use of the invention in substantially the arrangement shown herein.

Other objects will appear in the course of the ensuing description.

I attain the mentioned objects by the device illustrated, for example, in the accompanying drawing, in which—

Figure 1 is a general perspective view of the front part of a vehicle of the kind hereinbefore alluded to, with an embodiment of my invention applied thereto, the front wheel at the near side being omitted to better reveal the construction of the invention;

Fig. 2 is a detail perspective view of the half-bolster;

Fig. 3 is a similar view of the anchor-plate;

Fig. 4 is a similar view of one of the U-bolts;

Fig. 5 is a similar view of one of the clips;

Fig. 6 is a partial vertical longitudinal section on a plane corresponding to the line 6—6 of Fig. 1, further illustrating the bolster-and-spring connection; and Fig. 7 is a similar section on a plane corresponding to the line 7—7 of Fig. 1, further illustrating the axle-and-spring connection.

As I prefer to construct my invention, there is a half-bolster 1, comprising a head 2 from which it has a moderate curve to a foot 3; being shaped to conform to the under or inner side of the front bolster 4 of the vehicle, which, as regularly provided on the kind of vehicles before alluded to, is a channel, opening downwardly, bent up in both directions from its middle, and having short straight projections 5 past the vehicle-radiator sides where it is attached to the side frame-bars of the vehicle. Ordinarily, this vehicle has only a half-elliptic spring cross-wise at the front, with its top inside the middle part of this channel-shaped bolster 4, wherein it is held by the clips or U-bolts 6 that also clamp to the top of this bolster the bearing-block 7 that receives the front end of the vehicle-engine shaft for the application of the starting device.

In applying my invention, the regular half-elliptic spring is removed from this channel, and its ends are disconnected from the pedestals 8 to which they are regularly linked, and which have studs projecting down through the vehicle-axle 9 near opposite ends thereof. Where this spring is removed from the channel 4, my half-bolsters 1 are inserted inside the channel, each with its foot 3 clipped by the U-bolt 6 at the respective side of the bearing block 7, so that these U-bolts occupy the same positions that they originally did. Thus secured at the middle of the vehicle, the half-bolsters 1 project along inside the channel 4, with their curved parts lying closely up against the inner or under side of this channel, and with their heads 2 projecting past the ends of the channel at the opposite sides of the vehicle, their short, straight necks 2′, that connect the heads to the curved parts, lying in the short straight projections 5 of the bolster or channel 4. These necks 2' have openings 10 down through their middles, through which they are bolted to the bolster 4 and frame bars 11 by the lamp-pedestal bolts 12.

The head 2 of each half-bolster 1 has the two opposite pairs of ears 13 with openings 14 down through the respective ears.

The half-elliptic spring having been disconnected from the pedestals 8, the upper goose-necks 15 of these pedestals are not needed, and may be cut off if desired, although this is not essential. Where these pedestals 8 project below the axle 9, they are utilized to anchor the lower spring-attachment to the axle; although I prefer not to use these as the direct means of attachment for the spring. I prefer to make the lower direct connection between the spring and the axle some distance inward from the respective pedestal 8, but, by virtue of the anchorage afforded by the pedestal, to avoid drilling or otherwise marring or weakening the axle.

As herein shown, this lower connection comprises the anchor-plate 16, which is substantially flat, with a main part 17 that lies from front to rear under the axle 9 with a pair of ears 18 at each end, having holes 19 down through them, and with an extension 20 at the outer edge of this main part 17, having an opening 21 down through it to receive the lower projection of the pedestal 8 therethrough when the nut thereof is removed therefrom; this nut being again screwed in place below the anchor-plate extension. This secures the anchor-plate so that it cannot slip edgewise on the axle.

The springs 22 are full-elliptic, of full depth in proportion to the length; it being understood that these may be of any approved design and dimensions, to properly support and cushion the front end of the vehicle-body, as is well known in the art.

These springs 22 have their tops 23 up against the under sides of the respective half-bolster heads 2 at the opposite sides of the vehicle, and clips or U-bolts 24 straddle these tops at front and rear of the head 2, with their transverse members engaging the lower sides of the spring-tops 23 and the legs of the bolts projecting up through the holes or openings 14 in the ears 13 of the heads 2, down upon which are screwed the nuts 25. Thus, these springs 22 are firmly secured to the vehicle body at their tops.

The bottoms 26 of the springs 22 pass under the axle 9, being slipped thereon while the adjacent vehicle wheel is removed, so that the upper sides of these spring-bottoms 26 bear up against the lower surfaces of the respective anchor-plates 16, from front end to rear end of the main part 17.

Each lower attachment also comprises a pair of straps 27, each of U-shape in its middle, with lips 28 projecting out from the side members of the U. These are inverted to straddle the axle 9, with the lips 28 coming down against the upper sides of the ears 18 of the anchor-plate main part 17; each lip having a hole 29 registering with a respective hole 19 in an anchor-plate ear 18. Clips or U-bolts 30 straddle the spring-bottoms 26 at front and rear of the axle 9, in each lower attachment, with their transverse members engaging the lower sides of these spring-bottoms and the legs of the bolts projecting up through the registering holes or openings 19 and 29 in the ears and lips, down upon the latter of which are screwed the nuts 31. This firmly secures the springs 22 to the vehicle-axle at their bottoms.

By utilizing the embracing and clamping function of the clips, straps or U-bolts, together with the anchoring function, as represented by the pedestal connection 8 at the bottom, and by the lamp-pedestal-bolt connection 12 at the top, there is an entire avoidance of drilling or tapping any holes in the regular vehicle parts, or of otherwise cutting, marring or weakening any of these parts, in all of which ample strength is very important. Also, these anchorages function as gages by which the spring-connections are located so as to attach the springs 22 in correct upright positions. The considerable lateral extension, of the half-bolster 1 at the top, and of the anchor-plate 16 at the bottom, together with the firm attachment of these parts remote from the respective spring-clamping elements, insures ample rigidity of the connections laterally, to resist side thrusts of the vehicle chassis and body relatively to each other; the accomplishment of this result being very simple, in the absence of any drilling, tapping or other special operation on the regular vehicle-parts.

Moreover, the under-slung attachment of the springs 22 to the axle 9 permits the entire equipment to be located lower in the vehicle structure, avoiding any cumbersome and unsightly extension thereof above the frame elements at the top and at the same time having the full-elliptical spring of ample depth to afford the requisite cushioning effect. Also, the location of the equipment some distance inward from the available attaching means constituted by the pedestal 8 on the axle 9, removes all restriction on the length of the spring because it is far removed from the range of swinging of the front vehicle-wheels; and also avoids undue projection of the top attaching means from the side of the vehicle-frame. This contributes to strength combined with lightness and neatness of appearance at the top connection, and the ample length permitted in the springs is another factor in the interest of effectiveness of cushioning action of these.

It will thus be seen that my invention affords a decided improvement in the operation of the vehicle without weakening any part and with no detraction from the appearance; and, notwithstanding the advantages thus derived, the simplicity of construction permits of these at a cost that is proportionate to the value of the vehicles of this make for which it is especially intended. Also, the simplicity of installation permits any person of ordinary mechanical skill to readily install the springs on cars of the make alluded to, with the need of no tools except a suitable wrench to turn the several nuts that must be unscrewed or screwed in place in making the required substitutions and attachments. No measurements or nice adjustments are necessary, and opportunity for error in the work of installation is practically eliminated.

This invention is especially intended for the widely used vehicles mentioned, but it may be adapted for other kinds of vehicles, and modifications thereof may occur under these or other varying conditions, and therefore, while certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. In combination with a full-elliptical vehicle-spring, a bolster element having a foot to fit in a channeled vehicle bolster, to be clamped therein by a clip straddling said vehicle bolster, and comprising a head lying against the upper side of the top of said spring, a clip straddling the top of said spring and secured to said head for holding said spring top to said head, and means for securing the bottom of said spring to the under side of a vehicle axle.

2. In combination with a full-elliptical vehicle-spring, means for attaching the top of said spring to a vehicle body, an anchor-plate having a lateral extension with an opening, to lie against the under side of a vehicle axle with said extension receiving anchoring means through its opening, a clip to straddle said axle, and a clip to straddle said spring bottom, said clips being secured to said anchor-plate, for holding said spring bottom to said anchor-plate and holding said anchor-plate to said axle.

3. An attaching device for a vehicle-spring comprising an element with engaging means and an extension having an opening to receive anchoring means, a clip to straddle a vehicle axle, and a clip to straddle a vehicle-spring part, said clips being secured together and to said engaging means, for holding said element and said spring part to said axle.

4. An attaching device for a vehicle-spring comprising an element with a main part having opposite pairs of openings and a lateral extension having an opening to receive anchoring means, a pair of clips to straddle a vehicle axle, with lips having openings registering with respective ones of the openings in said element, and a pair of clips to straddle a vehicle-spring part, with members extending through the respective registering openings of said lips and said element, for holding said element and said spring part to said axle.

5. In combination with a full-elliptical vehicle-spring, means for attaching the top of said spring to a vehicle body, an anchor-plate having a lateral extension with an opening, to lie against the under side of a vehicle axle with said extension receiving anchoring means through its opening, and having a lower bearing part extended from opposite sides of said anchor-plate to fit down upon the upper side of the bottom of said spring, and means for holding said spring bottom to said anchor-plate.

6. In combination with a full-elliptical vehicle-spring, means for attaching the top of said spring to a vehicle body, an anchor-plate having a lateral extension with an opening, to lie against the under side of a vehicle axle with said extension receiving anchoring means through its opening, and having a lower bearing part extended from opposite sides of said anchor-plate to fit down upon the upper side of the bottom of said spring, and a clip straddling the bottom of said spring and secured to said anchor plate, for holding said spring bottom to said anchor-plate.

7. An attaching device for a vehicle-spring comprising an element with engaging means and an extension having an opening to receive anchoring means, and having its under side extended in opposite directions to lie along a respective part of the vehicle spring, and curved on its lower side to fit the top of the spring part, and means to embrace the spring part and engage with said engaging means, for holding said element and said spring part together.

8. An attaching device for a vehicle spring comprising a bolster element adapted to fit in a channeled vehicle bolster and to extend out past one end of said channeled bolster with its inner end extending not quite to a point midway of the length of said channel, and having a foot near said inner end with its lower side notched to receive the transverse part of a clip embracing the bolster element and the channeled bolster, whereby said bolster element is anchored by said clip, and means for attaching the outwardly extending part of said bolster element to the top of a vehicle spring.

9. An attaching device for a vehicle spring comprising a bolster element adapted to fit in a channeled vehicle bolster and to extend out past one end of said channeled bolster with its inner end extending not quite to a point midway of the length of said channel, and having a foot near said inner end with its lower side notched to receive the transverse part of a clip embracing the bolster element and the channeled bolster, whereby said bolster element is anchored by said clip, and said outwardly extending part having a lower bearing surface extended in opposite directions to lie along the top of the vehicle spring, and curved to fit the top of the spring part, and means to embrace the spring part and engage with said outwardly extending part, for holding said bolster element and said spring together.

10. In combination with a full-elliptical vehicle-spring, a bolster element adapted to fit in a channeled vehicle bolster and to extend out past one end of said channeled bolster with its inner end extending not quite to a point midway of the length of said channel, and having a foot near said inner end with its lower side notched to receive the transverse part of a clip embracing the bolster element and the channeled bolster, whereby said bolster element is anchored by said clip, and said outwardly extending part having a lower bearing surface extended in opposite directions to lie along the top of the vehicle spring, and curved to fit the top of the spring part, means to embrace the spring part and engage with said outwardly extending part, for holding said bolster element and said spring together, an anchor-plate having a lateral extension with an opening, to lie against the under side of the vehicle axle with said extension receiving anchoring means through its opening, and having a lower bearing surface extended from opposite sides of said anchor-plate to lie along the upper side of the bottom of said spring, and curved to fit said upper side, and a clip straddling the bottom of said spring and secured to said anchor plate, for holding said spring bottom to said anchor plate.

ELMER R. RITTER.